United States Patent [19]
Gentle et al.

[11] Patent Number: 5,516,823
[45] Date of Patent: *May 14, 1996

[54] ADHESION PROMOTING COMPOSITIONS AND CURABLE ORGANOSILOXANE COMPOSITIONS CONTAINING SAME

[75] Inventors: Theresa E. Gentle; Michael A. Lutz, both of Midland, Mich.

[73] Assignee: Dow Corning Corporation, Midland, Mich.

[*] Notice: The term of this patent shall not extend beyond the expiration date of Pat. No. 5,399,651.

[21] Appl. No.: 240,130

[22] Filed: May 10, 1994

[51] Int. Cl.$^6$ .............................. C08K 5/24; C08G 77/06
[52] U.S. Cl. ..................... 524/264; 524/265; 524/268; 524/588; 524/731; 524/862; 528/15; 528/24; 528/32; 528/33
[58] Field of Search ..................... 528/15, 24, 32, 528/33; 524/588, 264, 265, 268, 862, 731

[56] References Cited

U.S. PATENT DOCUMENTS

| | | | |
|---|---|---|---|
| 3,772,026 | 11/1973 | Greenwald | 96/77 |
| 3,873,334 | 3/1975 | Lee et al. | 106/287 SE |
| 4,077,943 | 3/1978 | Sato et al. | 260/46.5 UA |
| 4,082,726 | 4/1978 | Mine et al. | 260/46.5 UA |
| 4,087,585 | 5/1978 | Schulz | 428/429 |
| 4,196,273 | 4/1980 | Imai et al. | 528/15 |
| 4,329,273 | 5/1982 | Hardman et al. | 524/862 |
| 4,659,851 | 4/1987 | Plueddemann | 556/431 |
| 4,677,161 | 6/1987 | Suzuki et al. | 524/862 |
| 4,719,262 | 1/1988 | Plueddemann | 525/105 |
| 4,721,764 | 1/1988 | Fujiki et al. | 528/15 |
| 4,732,932 | 3/1988 | Waldern | 524/862 |
| 4,786,701 | 11/1988 | Tanaka | 528/15 |
| 4,906,686 | 3/1990 | Suzuki et al. | 524/730 |
| 4,912,188 | 3/1990 | Colas et al. | 528/15 |
| 5,106,933 | 4/1992 | Kobayashi et al. | 528/15 |
| 5,232,959 | 8/1993 | Togashi et al. | 523/211 |
| 5,399,651 | 3/1995 | Gentle et al. | 528/33 |

FOREIGN PATENT DOCUMENTS

| | | | |
|---|---|---|---|
| 0449181 | 10/1991 | European Pat. Off. | C08L 83/07 |
| 0469890 | 2/1992 | European Pat. Off. | C08L 83/07 |

OTHER PUBLICATIONS

Japanese Abstract 4311766, Jan. 1992.
Japanese Abstract 2018452, Jan. 1990.
Japanese Abstract 1085224, Mar. 1989.

*Primary Examiner*—Melvyn I. Marquis
*Assistant Examiner*—Karen A. Dean
*Attorney, Agent, or Firm*—Robert Spector

[57] ABSTRACT

Adhesion-promoting additives for use in curable organosiloxane compositions comprise 1) at least one organosiloxane comprising a) silicon bonded hydrogen atoms and/or ethylenically unsaturated substituents bonded to silicon through carbon and b) at least one silicon atom containing three hydrolyzable groups, and 2) at least one silane containing four alkoxy or enoloxy groups or three of these groups and a hydrocarbon radical containing an epoxy or ethylenically unsaturated group as a substituent.

8 Claims, No Drawings ns an adhe-

ADHESION PROMOTING COMPOSITIONS AND CURABLE ORGANOSILOXANE COMPOSITIONS CONTAINING SAME

BACKGROUND OF THE INVENTION

1. Field of the Invention

This invention relates to adhesion promoting additives for curable organosiloxane compositions. More particularly, this invention relates to additives that impart excellent adhesion to organosiloxane compositions. The additives are especially useful for organosiloxane compositions that cure by a platinum-catalyzed hydrosilation reaction at temperatures up to 100° C. and composition that cure upon irradiation with ultra-violet light.

2. Background Information

Adhesion additives for curable organosiloxane compositions are organosilicon compounds that typically contain at least two functional groups.

U.S. Pat. No. 3,772,026 and U.S. Pat. No. 3,873,334 describe acyloxy functional silanes which additionally have silicon hydride or alkenyl functionality respectively. Although the acyloxy functionality is very reactive, it liberates corrosive acetic acid upon reaction with hydroxyl groups present at the surface of the substrate or with water ingressing into the composition.

U.S. Pat. No. 4,196,273 discloses unsaturated alkoxysilanes as adhesion additives, however, adhesion is not demonstrated at temperatures below 100° C. and only adhesion to glass is demonstrated at 100° C.

U.S. Pat. No. 4,329,273 teaches using partial hydrolyzates of unsaturated alkoxysilane. Compositions containing these adhesion additives cured at 100° C. but not at ambient laboratory temperatures.

U.S. Pat. No. 4,082,726 describes adhesion promoters that are organosilicon compounds containing epoxy functional dialkoxysilyl groups and at least one alkenyl group or hydrogen atom bonded to silicon in the organosilicon compound. Adhesion is demonstrated after curing at temperatures between 100° and 200° C.

U.S. Pat. No. 4,087,585 teaches physical blends of epoxy functional alkoxysilanes with silanol functional fluids containing alkenyl functionality. The compositions were cured at temperatures below 150° C. for elastomer compositions whose adhesion was measured.

Organosilanes containing ethylenic unsaturation, epoxy functionality, and alkoxy functionality are taught in U.S. Pat. No. 4,732,932.

U.S. Pat. No. 5,106,933 uses at least two of the following compounds as adhesion promoters: organosilicon compounds containing at least one (meth)acryloxyalkyl or epoxy group and at least two silicon-bonded alkoxy groups and isocyanurate compounds.

U.S. Pat. No. 4,659,851, U.S. Pat. No. 4,719,262, and U.S. Pat. No. 4,906,686 each teach reaction products of unsaturated alcohols with alkoxysilanes. However, the resultant Si—O—C bond between the unsaturated alcohol and alkoxysilane would be susceptible to hydrolysis, with the result that adhesion may be substantially decreased upon exposure to moisture.

U.S. Pat. No. 4,077,943 teaches use of a silicon hydride crosslinker which additionally contains epoxy functionality.

U.S. Pat. No. 4,786,701 teaches adhesion promoters which are hydrolysis reaction products of tetraalkoxysilanes, alkenyl or silicon hydride functional organopolysiloxanes, and optional (meth)acryloxy functional alkoxysilanes.

U.S. Pat. No. 4,677,161 teaches silicon hydride functional $SiO_2$ resins containing residual OR functionality, but no $Si(OR)_3$ functional groups are present.

None of the aforementioned patents demonstrate adhesion at temperatures below 100° C. or adhesion to a variety of substrates.

European Published Application 449,181 describes organohydrogensiloxanes containing at least two silicon-bonded hydrogen atoms and at least one trialkoxysilyl group. Organosiloxane compositions containing this compound exhibited adhesion after curing at temperatures between 120°–150° C.

Japanese Laid Open Pat. Application (JLOPA) 4/311,766 teaches adhesion promoting additives containing a) siloxane units with at least one alkoxysilylalkyl group, b) siloxane units with at least one terminally unsaturated alkenyl radical; c) trialkoxysiloxy units and d) $SiO\frac{1}{2}$ units. JLOPA 1/085,224 teaches accelerating the development of adhesion using organosiloxanes containing epoxy functional silsesquioxane units and optional ethylenic unsaturation, but no $Si(OR)_3$ functional groups. JLOPA 2/18452 describes adhesion promoters that include organosilicon compounds containing two silicon-bonded alkoxy groups and at least one epoxy group and organosilicon compounds containing at least one alkoxy group and at least two ethylenically unsaturated double bonds per molecule. JLOPA 1/085,224 teaches adhesion accelerators based on epoxy functional silsesquioxane units, optionally containing unsaturation, but no $Si(OR)_3$ functional groups.

U.S. Pat. No. 4,912,188 teaches linear organosilicon compounds containing olefinically unsaturated hydrocarbons, epoxy functionality, and optional alkoxy functionality at the terminus of the silicon compound. Compositions containing these compounds did not cure after 24 hours at room temperature. Adhesion was demonstrated after cure at 150° C.

U.S. Pat. No. 4,721,764 teaches organopolysiloxanes containing two silicon bonded hydrogen atoms and at least one silicon bonded hydrolyzable group or oxirane group.

U.S Pat. No. 5,232,959 describes curable organosiloxanes containing as the curing agent an organohydrogenpolysiloxane comprising a linear sequence of at least five silicon atoms. Each molecule of this organohydrogensiloxane contains at least three silicon-bonded hydrogen atoms, at least one epoxy group, and at least one trialkoxysilyl alkyl group. The organohydrogenpolysiloxane is the sole curing agent and therefore forces limitations in formulation latitude. None of these patents demonstrate adhesion at temperatures below 120° C.

European Published Application 469,890 teaches organopolysiloxane compositions wherein at least one of the alkenyl or organohydrogenpolysiloxanes contains at least two alkoxy groups and/or at least one epoxy group in the molecule. The cured products were gels which were cured between 80°–150° C. Gels are known to have self adherent properties.

One objective of this invention is to provide additives for organosiloxane compositions that impart excellent adhesion to substrates that are in contact with the compositions during curing. The additives are particularly useful in compositions that cure by a hydrosilation reaction at temperatures up to 100° C.

SUMMARY OF THE INVENTION

The objectives of the present invention are achieved by including in curable organosiloxane compositions an adhesion-promoting additive comprising 1) at least one organosiloxane comprising a) silicon bonded hydrogen atoms and/or ethylenically unsaturated substituents bonded to silicon through carbon and b) at least one trialkoxysilylalkyl group, and 2) at least one silane containing either a) four alkoxy or enoloxy groups or b) three of these groups and a hydrocarbon radical containing an epoxy or ethylenically unsaturated group as a substituent.

DETAILED DESCRIPTION OF THE INVENTION

This invention provides adhesion promoting additives for curable organosiloxane compositions wherein said additives comprise (I) an organosiloxane comprising at least one unit of the general formula $R^1R^2_aSiO_{(3-a)/2}$ and at least one terminal unit containing three silicon-bonded hydrolyzable groups selected from the group consisting of alkoxy and enoloxy; and (II) an organosilicon compound selected from the group consisting of silanes of the formula $R^3_bSi(OR^4)_{4-b}$ and bis-silylalkanes of the formula $[(R^4O)_3Si]_2R^5$ wherein $R^1$ is selected from the group consisting of hydrogen, alkenyl radicals, and $CH_2=CR^6C(O)OR^7$—, $R^2$ represents an unsubstituted or substituted monovalent hydrocarbyl radical, $R^3$ represents a monovalent ethylenically unsaturated group bonded to silicon through carbon or an epoxide-substituted hydrocarbon radical, $OR^4$ is selected from the group consisting of alkoxy groups containing from 1 to 4 carbon atoms and enoloxy groups containing from 3 to 6 carbon atoms, $R^5$ is an alkylene radical, $R^6$ is hydrogen or methyl, $R^7$ is an alkylene radical, a is 0, 1 or 2, and b is 0 or 1.

This invention also provides improved curable organosiloxane compositions comprising A. a curable polyorganosiloxane;

B. an amount sufficient to cure said composition of an curing agent; and

C. an amount sufficient to promote curing of said composition of a curing catalyst; wherein curing of said composition is achieved by the reaction of silicon-bonded hydrogen atoms on said curing agent with alkenyl radicals or silanol groups present on said polyorganosiloxane or by the photoinduced generation of free radicals.

The improvement that characterizes the present compositions comprises the presence in said composition of an adhesion promoting additive of the present invention.

As used in this specification the term "cure" means the conversion of a liquid or semi-solid composition to a crosslinked elastomeric or resinous material. Curing of the present compositions is achieved by 1) the reaction of silicon bonded hydrogen atoms with alkenyl radicals, also referred to as "hydrosilation", and/or silanol groups or 2) the generation of free radicals initiated by the decomposition of photosensitive compounds such as alpha-hydroxyketones.

Some compounds curable by free radical reactions, particularly those wherein the reactive groups on the curable polyorganosiloxane are (meth)acryloxy or acrylamide may not require a curing agent or a curing catalyst.

The present adhesion additives are particularly suitable for organosiloxane compositions that cure by a platinum group metal-catalyzed hydrosilation reaction. The ingredients of these preferred compositions will be discussed in detail later in this specification.

The Adhesion Promoting Additives (Ingredient D)

The characterizing feature of the present adhesion promoting compositions is the combination of 1) an organosiloxane containing at least one unit per molecule of the formula $R^1R^2_aSiO_{(3-a)/2}$ and at least one terminal unit containing three silicon-bonded hydrolyzable groups selected from alkoxy and enoloxy; and 2) and either a silane of the formula $R^3_bSi(OR^4)_{4-b}$ or a bis-silylalkane of the formula $[(R^4O)_3Si]_2R^5$.

The organosiloxane will be referred to in this specification as ingredient D1 and the silane or bis-silylalkane as ingredient D2.

The substituent represented by $R^1$ in ingredient D1 is capable of participating in a hydrosilation reaction and can be a silicon-bonded hydrogen atom or an ethylenically unsaturated group selected from alkenyl radicals and (meth)acryloxyalkyl groups.

Suitable alkenyl radicals contain from 2 up to 20 or more carbon atoms. This radical preferably contains from 2 to 12 carbon atoms, and is terminally unsaturated. Particularly preferred alkenyl radicals include vinyl, 5-hexenyl or 10-undecenyl. When $R^1$ represents a (meth)acryloxyalkyl group it is preferably 3-methacryloxypropyl.

The substituent represented by $R^2$ in ingredient D1 can be any monovalent unsubstituted or substituted hydrocarbon radical that will not interfere with the development of adhesion or the curing reaction of compositions containing the present adhesion additives. $R^2$ is preferably alkyl containing from 1 to about 10 carbon atoms, phenyl or 3,3,3-trifluoropropyl, and most preferably methyl, based on the availability of the starting materials. Chlorosilanes or cyclic diorganosiloxanes are the reactants typically used to prepare ingredient D1.

The repeating units of ingredient D1 containing the $R^1$ substituent can contain from 0 to 2 silicon-bonded hydrocarbon radicals represented by $R^2$. If more than one $R^2$ radical is present on a silicon atom, these can be identical or different.

Siloxane units containing the $R^1$ substituent typically constitute up to about 50 percent, preferably from 10 to 30 percent, of the repeating units present in ingredient D1.

Up to about 50 percent of the siloxane units in ingredient D1 contain three silicon-bonded hydrolyzable groups such as alkoxy and enoloxy. These units can be terminal units of the formula $(XO)_3SiO$—, where OX represents the hydrolyzable group, or branch units of the formula $(XO)_3SiR^8$— where $R^8$ is an alkenyl radical bonded to the silicon atom of a siloxane unit. When OX represents an alkoxy group the branch unit is referred to as a trialkoxysilylalkyl unit.

Examples of alkoxy groups represented by OX and $OR^4$ include but are not limited to methoxy, ethoxy and n-propoxy. Preferred alkoxy groups contain from 1 to 4 carbon atoms, based on the superior adhesion achieved when these groups are present. The enoloxy group contains from 3 to 6 carbon atoms, and is preferably isopropenyloxy, —$OC(CH_3)=CH_2$.

Any remaining non-terminal siloxane units in ingredient D1 constitute up to 70 percent of the repeating units of this ingredient and contain 0, 1 or 2 monovalent unsubstituted or substituted hydrocarbon radicals bonded to the silicon atoms.

The terminal units of the siloxanes used as ingredient D1 are typically $R^1R^2_2SiO$—, $R^2_3SiO$— or $(XO)_3SiO$—, where OX represents a hydrolyzable group.

Organosiloxanes containing at least one siloxane unit with fewer than two hydrocarbon radicals or other monovalent substituents bonded to silicon will have a branched configuration. These siloxane units typically constitute no more than 50 percent of the total number of siloxane units present in ingredient D1.

A preferred method for preparing ingredient D1 is by reaction of a liquid or solubilized organohydrogensiloxane with at least one organosilicon compound containing a silicon-bonded ethylenically unsaturated hydrocarbon radical and at least one silicon atom bonded to three hydrolyzable alkoxy or enoloxy groups.

The reaction between the organohydrogensiloxane and the ethylenically unsaturated compounds is conducted in the presence of a platinum group metal-containing hydrosilation catalyst.

The organohydrogensiloxane reactant used to prepare ingredient D1 can be linear or branched and preferably contains at least three silicon-bonded hydrogen atoms per molecule. The terminal siloxane units of this reactant typically contain three monovalent hydrocarbon radicals or two of these hydrocarbon radicals and a hydrogen atom bonded to the silicon atom.

If all of the non-terminal siloxane units of the organohydrogensiloxane do not contain silicon-bonded hydrogen atoms, the additional siloxane units can be represented by the formula $R^9_e SiO_{4-e/2}$, where each $R^9$ is individually selected from monovalent unsubstituted and substituted hydrocarbon radicals and e is 0 or an integer from 1 to 3, inclusive. If more than one hydrocarbon radical is present on a given siloxane unit, they can be identical or different.

In an alternative method for preparing ingredient D1 a polyorganosiloxane wherein at least two of the siloxane units contain a silicon bonded alkenyl radical such as vinyl, allyl or 5-hexenyl is reacted with an organosilicon compound containing a silicon bonded hydrogen atom and a silicon atom bonded to three hydrolyzable groups. The reaction is conducted in the presence of a hydrosilation catalyst.

Ingredient D1 contains either silicon bonded hydrogen atoms or ethylenically unsaturated organofunctional groups such as vinyl and 3-methacryloxypropyl and, optionally, epoxide groups. The reactive substituents on ingredient D1 react either with other ingredients of the curable organosiloxane composition or with the substrate during curing of the organosiloxane composition.

Suitable epoxide-containing reactants for preparing ingredient D1 from organohydrogensiloxanes include but are not limited to allylglycidyl ether and limonene oxide.

The second ingredient of the present adhesion additives, referred to as ingredient D2, is a silane or bis-disilylalkane containing at least 3 alkoxy or enoloxy groups, represented by $OR^4$ in the preceding formula for this ingredient. The alkoxy group contains from 1 to 4 carbon atoms and the enoloxy group contains from 3 to about 6 carbon atoms. Other silicon-bonded hydrolyzable groups such as ketoximo can be substituted for the alkoxy or enoloxy groups in this ingredient so long as these alternative groups do not interfere with curing or adhesion of organosiloxane compositions containing the present adhesion promoting additives.

Bis-silylalkanes suitable for use as ingredient D2 can be represented by the formula $[(R^4O)_3Si]_2R^5$, where $R^5$ is alkylene and preferably contains from 2 to 6 carbon atoms.

When ingredient D2 contains three alkoxy or enoloxy groups the remaining silicon-bonded substituent, represented by $R^3$ in the general formula for this ingredient, is an ethylenically unsaturated group or an epoxide-containing hydrocarbon radical.

The ethylenically unsaturated substituents are selected from the group of ethylenically unsaturated substituents represented by $R^1$ in ingredient D1.

The silanes that can be used as ingredient D2 are commercially available or can be synthesized from available starting materials using known procedures.

Specific examples of ingredient D2 include but are not limited to tetraalkyl orthosilicates such as tetramethyl orthosilicate, tetraethyl orthosilicate, tetra-n-propyl orthosilicate, vinyltrimethoxysilane, vinyltriethoxysilane, 5-hexenyltrimethoxysilane, 3-methacryloxypropyltrimethoxysilane and 3-glycidoxypropyltrimethoxysilane.

One embodiment of this invention relates to curable organosiloxane compositions containing the compounds identified as ingredients D1 and D2 as adhesion promoters. The combined concentration of ingredients D1 and D2 is typically from about 1 to about 20 weight percent, based on the total weight of the curable composition and ingredient D1 constitutes from 25 to 75 percent of the total concentration of adhesion promoting additive.

The ingredients of curable organosiloxane compositions that cure by a hydrosilation reaction and are preferred for use with the present adhesion promoters will now be described in detail.

The Alkenyl-Containing Polyorganosiloxane (Ingredient A)

The polyorganosiloxane referred to as ingredient A of preferred curable organosiloxane compositions of this invention is the principal ingredient of these compositions. This ingredient must contain at least two silicon-bonded alkenyl radicals in each molecule. Suitable alkenyl radicals contain from 1 to about 10 carbon atoms and are exemplified by but not limited to vinyl, allyl and 5-hexenyl. The silicon-bonded organic groups other than alkenyl radicals present in ingredient A are typically monovalent hydrocarbon and halogenated hydrocarbon radicals exemplified by but not limited to alkyl radicals such as methyl, ethyl and propyl; aryl radicals such as phenyl; and halogenated alkyl radicals such as 3,3,3-trifluoropropyl.

The molecular structure of ingredient A is not critical to the present invention, and will be determined by the physical properties desired in the cured composition. To achieve a useful level of tensile properties in the elastomers and other products prepared by curing the present compositions, the molecular weight of this ingredient should be sufficient to achieve a viscosity at 25° C. greater than about 0.1 Pa.s.

The upper limit for the molecular weight of ingredient A is not specifically restricted, and is typically limited only by the processability of the curable organosiloxane composition. The polyorganosiloxanes range from pourable liquids to gum type polymers that are typically characterized by Williams plasticity values.

When ingredient $D^1$ contains at least two alkenyl radicals, this portion of the adhesion promoting additive also participates in the curing reaction, thereby reducing the concentration of ingredient A required to achieve a given physical property profile.

Preferred embodiments of ingredient A are polydiorganosiloxanes represented by the general formula I

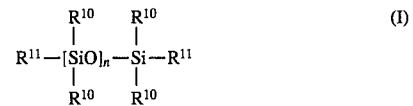

where each $R^{10}$ is individually selected from monovalent hydrocarbon radicals and monovalent halohydrocarbon radicals that optionally contain ethylenic unsaturation, $R^{11}$ represents a vinyl or other alkenyl radical, and n represents a degree of polymerization equivalent to a viscosity of at least 100 centipoise (0.1 Pa.s), preferably from 0.1 to 10 Pa.s.

The two $R^{10}$ substituents on each of the silicon atoms in formula I can be identical or different, and can contain from 1 to about 20 carbon atoms. A range of from 1 to 10 carbon atoms is preferred based on the availability of the corresponding monomers. Most preferably at least one of the hydrocarbon radicals on each silicon atom is methyl, and any remainder are vinyl, 5-hexenyl, phenyl and/or 3,3,3-trifluoropropyl, this preference being based on the availability of the reactants typically used to prepare the polydiorganosiloxane and the properties of cured elastomers prepared from these polydiorganosiloxanes. For the same reasons, $R^{11}$ is preferably vinyl or 5-hexenyl.

Representative embodiments of ingredient A containing ethylenically unsaturated hydrocarbon radicals only at the terminal positions include but are not limited to dimethylvinylsiloxy-terminated polydimethylsiloxanes, dimethylvinylsiloxy-terminated polymethyl-3,3,3trifluoropropylsiloxanes, dimethylvinylsiloxy-terminated-dimethylsiloxane/ 3,3,3-trifluoropropylmethylsiloxane copolymers and dimethylvinylsiloxy-terminated-dimethylsiloxane/methylphenylsiloxane copolymers.

Methods for preparing ingredient A of the present compositions by hydrolysis and condensation of the corresponding halosilanes or by polymerization of the corresponding cyclic polydiorganosiloxanes are sufficiently disclosed in the patent and other literature that a detailed description in this specification is not necessary.

For applications requiring high levels of physical properties such as tear strength it may be desirable to include in the curable organosiloxane composition a second polydiorganosiloxane containing ethylenically unsaturated hydrocarbon radicals bonded to both terminal and non-terminal silicon atoms.

The Organohydrogensiloxane Curing Agent (Ingredient B)

Preferred curable organosiloxane compositions of this invention contain at least one organohydrogensiloxane that functions as a curing agent for ingredient A. In the presence of the hydrosilation catalyst, referred to as ingredient C, the silicon-bonded hydrogen atoms in ingredient B undergo an addition reaction, referred to as hydrosilation, with the silicon-bonded alkenyl groups in ingredient A, resulting in crosslinking and curing of the composition.

Ingredient B must contain at least 2 silicon-bonded hydrogen atoms in each molecule. If ingredient A contains only two alkenyl radicals per molecule, ingredient B must contain an average of more than two silicon-bonded hydrogen atoms to achieve a crosslinked structure in the final cured product. The silicon-bonded organic groups present in ingredient B are selected from the same group of monovalent hydrocarbon and halogenated hydrocarbon radicals as the organic groups of ingredient A, with the proviso that the organic groups in ingredient B must be substantially free of ethylenic or acetylenic unsaturation. The molecular structure of ingredient B can be straight chain, branch-containing straight chain, cyclic, or network.

While the molecular weight of ingredient B is not specifically restricted, viscosities in the range of 3 to 10,000 centipoise (0.003 to 10 Pa.s) at 25 degrees Centigrade are preferred.

The concentration of ingredient B is sufficient to provide a molar ratio of silicon-bonded hydrogen atoms to alkenyl radicals in the curable composition of from 0.5 to 20. A range of from 0.5 to 2 is preferred.

When the curable composition contains less than 0.5 moles of silicon-bonded hydrogen atoms per mole of alkenyl radicals it may not be possible to achieve the desired physical properties following curing. The physical properties of the cured article may vary with time when this ratio exceeds about 20 moles of silicon-bonded hydrogen per mole of alkenyl radicals.

When ingredient D1 is an organosiloxane containing at least two silicon-bonded hydrogen atoms per molecule, the presence of this ingredient will typically reduce the quantity of ingredient B required to achieve a given physical property profile in cured articles prepared using the present compositions. In some instances the concentration of silicon-bonded hydrogen atoms contributed by ingredient D1 may be sufficient to completely cure the composition without the need for any additional curing agent.

The Platinum-Containing Hydrosilation Reaction Catalyst (Ingredient C)

Curing of preferred organosiloxane compositions is catalyzed by a hydrosilation catalyst that is a metal from the platinum group of the periodic table or a compound of such a metal. These metals include platinum, palladium and rhodium. Platinum and platinum compounds are preferred based on the high activity level of these catalysts in hydrosilation reactions.

Examples of preferred curing catalysts include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organosiloxanes containing ethylenically unsaturated hydrocarbon radicals bonded to silicon. Complexes of chloroplatinic acid with the aforementioned organosiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of ingredient C in the present compositions is equivalent to a platinum concentration of from 0.1 to 500 parts by weight of platinum metal, preferably from 1 to 50 parts by weight of platinum metal, per million parts (ppm), based on the combined weight of ingredients A and B.

Curing does not proceed satisfactorily at below 0.1 ppm of platinum, while using more than 500 ppm results in no appreciable increase in cure rate, and is therefore uneconomical.

Optional Ingredients

Platinum Catalyst Inhibitors

Mixtures of the aforementioned ingredients A, B and C may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalyst inhibitors typically require heating at temperatures of 70° C. or above to cure at a practical rate.

When it is desired to increase the pot life of a curable composition under ambient conditions, this can be accomplished using an alkenyl substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

Reinforcing Fillers

To achieve high levels of tear strength and other physical properties that characterize some types of cured elastomers that can be prepared using the compositions of this invention, it may be desirable to include a reinforcing filler such as finely divided silica. Silica and other reinforcing fillers are often treated with one of more of the known filler treating agents to prevent a phenomenon referred to as "creping" or "crepe hardening" during processing of the curable composition.

Finely divided forms of silica are preferred reinforcing fillers. Fumed silicas are particularly preferred because of their relatively high surface area, which is typically at least 50 square meters per gram. Fillers having surface areas of at least 200 square meters per gram are preferred for use in the present method.

The amount of finely divided silica or other reinforcing filler used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

The filler treating agent can be any of the low molecular weight organosilicon compounds disclosed in the art as being suitable for preventing creping of organosiloxane compositions during processing. The treating agents are typically liquid hydroxyl terminated polydiorganosiloxanes containing an average of from 2 to about 20 repeating units per molecule, and organosilicon compounds such as hexaorganodisiloxanes and hexaorganodisilazanes that hydrolyze and condense under the conditions used to treat the filler. Preferably at least a portion of the silicon bonded hydrocarbon radicals present on the treating agent are identical to a majority of the hydrocarbon radicals present in ingredients A and B. A small amount of water can be added together with the silica treating agent(s) as a processing aid.

It is believed that the treating agents function by reacting with silicon-bonded hydroxyl groups present on the surface of the silica or other filler particles to reduce interaction between these particles and the polyorganosiloxanes present in the curable composition.

When a silica filler is used, it is preferably treated in the presence of at least a portion of the other ingredients of the present compositions by blending these ingredients together until the filler is completely treated and uniformly dispersed to form a homogeneous material.

The ingredients that are present during treatment of the filler typically include the silica treating agents and at least a portion of the polydiorganosiloxane(s) referred to herein as ingredient A.

Additional Optional Ingredients

The present organosiloxane compositions can contain one or more additives that are conventionally present in curable compositions of this type to impart or enhance certain physical properties of the cured composition in addition to adhesion or to facilitate processing of the curable composition.

Typical additives include but are not limited to non-reinforcing fillers such as quartz, alumina, mica and calcium carbonate; pigments such as carbon black and titanium dioxide; dyes, flame retardants, and heat and/or ultraviolet light stabilizers. Resinous organosiloxane copolymers can be used in place of or in combination with one or more reinforcing fillers to improve the physical properties of the cured organosiloxane composition.

A preferred type of resinous copolymer contains repeating units of the general formula $SiO_{4/2}$ in addition to triorganosiloxy units of the general formulae $R^{12}_3SiO_{1/2}$ and diorganovinylsiloxy units of the general formula $CH_2=CH(R^{13})_2SiO_{1/2}$. In these formulae $R^{12}$ and $R^{13}$ are individually monovalent hydrocarbon or substituted monovalent hydrocarbon radicals as previously defined for the $R^9$ radicals of ingredient A.

The molar ratio of the combination of triorganosiloxy units and diorganovinylsiloxy units to $SiO_{4/2}$ units in the resinous copolymer is from 0.7 to 1.2, inclusive. The vinyl-containing units constitute from 2 to 8 percent by weight of the copolymer, which preferably contains at least two vinyl radicals per molecule. In preferred embodiments of the copolymer the ranges for the molar ratio of diorganovinylsiloxy: triorganosiloxy:$SiO_{4/2}$ units is 0.08–0.1: 0.06–1: 1.

The resinous copolymers can be prepared as described in U.S. Pat. No. 2,676,182, which issued to Daudt and Tyler on Apr. 20, 1954 and is hereby incorporated in this specification by reference thereto for a description of these copolymers and a method for their preparation. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxy units than the concentration range taught by Daudt et al.

Briefly, the method of Daudt et al. comprises reacting a silica hydrosol under acidic conditions with the appropriate amount of hexamethyldisiloxane or trimethylchlorosilane. The resinous copolymers used to prepare the present elastomers can be obtained by reacting Daudt et al's. product with the required amount of a hexaorganodisilazane or a hexaorganodisiloxane wherein each silicon atom contains a vinyl radical and two methyl or other hydrocarbon radicals represented by $R^{11}$ and $R^{12}$ in the foregoing formula.

Preparation of Curable Compositions

The compositions of this invention can be prepared by combining all of ingredients at ambient temperature. Any of the mixing techniques and devices described in the prior art can be used for this purpose. The particular device used will be determined by the viscosity of the ingredients and the final curable composition. Suitable mixers include but are not limited to paddle type mixers, kneader type mixers and two- and three-roll rubber mills.

Cooling of the ingredients during mixing may be desirable to avoid premature curing of the composition.

To maximize storage stability the curable compositions are preferably kept in closed containers until used. If greater storage stability is desired, the compositions can be packaged in two or more containers with the organohydrogensiloxane (ingredient B) and the platinum group metal catalyst in separate containers.

Depending upon the types and concentrations of ingredients A and B, cured organosiloxane materials prepared using the present compositions can vary in properties from brittle resins to elastomers to gels, and are useful in a variety of end-use applications as coatings or as molded or extruded articles. Unfilled materials are particularly useful as adhesives, protective coatings, encapsulants and potting compositions for protecting delicate electronic devices such as transistors and integrated circuits from damage by moisture and other materials present in the environment that can adversely affect operation of the device. The compositions can be used to coat either the individual devices or a circuit board containing a number of these devices together with other electronic components.

The present compositions can be applied to substrates by spraying, dipping, pouring, extrusion or by the use of a brush, roller or coating bar. The selection of a particular application method will be determined at least in part by the viscosity of the curable composition. The viscosity of the composition can be reduced using suitable solvents or reactive diluents as known in the art.

Curing of the present compositions commences when ingredients A, B and C are combined. One advantage of the present adhesion promoting compositions is the absence of substantial retardation of the curing reaction.

Organosiloxane compositions containing the present adhesion additives cohesively bond to a variety of organic and inorganic substrates during curing at temperatures as low as 25° C. The ability of the present compositions to develop adhesion when cured at these relatively low temperatures makes them suitable for application to substrates that cannot withstand the elevated temperatures of 100° C. or higher required to cure organosiloxane compositions containing prior art adhesion promoters that can inhibit platinum group metal catalysts.

Preferred compositions cure over a period of several hours under ambient conditions. As is true for other compositions that cure by a platinum-catalyzed hydrosilation reaction, curing can be accelerated by heating. Curing temperatures of from 25° to about 80° C. are preferred.

The present adhesion promoting additives are also useful as primer compositions in combination with organosiloxane compositions that cure by reactions other than hydrosilation.

EXAMPLES

The examples in this section of the specification are based on preferred embodiments of the present adhesion promoting additives and curable compositions containing these additives. The examples should not be interpreted as limiting the scope of the invention defined in the accompanying claims. Unless otherwise specified, all parts and percentages in the examples are by weight and viscosities are the values measured at 25° C.

The following general procedure was used to prepare the adhesion promoting additives.

The organosiloxanes used as intermediates were dried over molecular sieves.

Organosiloxane 1 was a copolymer containing $Hme_2SiO_{1/2}$ units, where Me is methyl, and $SiO_{4/2}$ units. The copolymer contained 1.0 weight percent of silicon-bonded hydrogen.

Organosiloxane 2 was a trimethylsiloxy-terminated polydiorganosiloxane containing an average of five methylhydrogensiloxane units and three dimethylsiloxane units per molecule with a silicon-bonded hydrogen atom content of 0.77 weight percent.

Organosiloxane 3 was a copolymer containing trimethylsiloxy, dimethylvinylsiloxy and $SiO_{4/2}$ units in a molar ratio of 1.38: 0.42:1, respectively.

Hexenyltrimethoxysilane was freshly distilled from sodium methoxide.

Allylglycidyl ether and trimethoxysilane were purchased from Aldrich Chemical Co. and used as received.

Toluene was reagent grade and freshly distilled from calcium hydride.

The platinum catalyst was a coordination complex formed by reacting platinic chloride and sym-tetramethyldivinyldisiloxane. The reaction product was diluted with toluene to achieve a platinum content of 0.99 weight percent.

A glass reactor was charged with the required amount of organohydrogensiloxane and 50 g toluene. The reactor was then equipped with a magnetically operated stirring bar, thermometer, addition funnel, water cooled condenser and a gas bubbler tube.

The ethylenically unsaturated reactant and, when required, sufficient toluene to achieve a total volume of 50 ml, were placed in the addition funnel. The system was kept under a light purge with a gas mixture containing 4% oxygen in nitrogen.

The reaction mixture was then stirred, sparged with the same oxygen/nitrogen mixture using a syringe needle as the inlet tube, the platinum catalyst added and the resultant mixture heated to 100° C. When the temperature reached 100° C. the contents of the addition funnel were added over a 1–2 hour time period.

Samples were periodically withdrawn from the reactor and analyzed using gas liquid chromatography to determine the concentration of reactants. When the reaction was shown to be more than 95 percent complete, the volatile materials were removed under a pressure of less than 10 mm Hg and a temperature of 100° C.

Adhesion additive D1(a) was prepared using 30.79 g of organosiloxane 1, 6.96 g allylglycidyl ether, 12.25 g hexenyltrimethoxysilane, and 29 microliters of the platinum catalyst solution.

Adhesion Additive D1(b) was prepared using 33.93 g of organosiloxane 2, 5.83 g allylglycidyl ether, 10.24 g hexenyltrimethoxysilane, and 29 microliters of the platinum catalyst solution.

The stoichiometry of the reactants used to prepare adhesion additives D1(a) and D1(b) was equivalent to reacting 20% of the silicon bonded hydrogen atoms of the organohydrogensiloxane with the hexenyltrimethoxysilane and 20% with the unsaturated epoxy functional compound.

Adhesion Additive D1(c) was prepared using 34.54 g of organosiloxane 2, 15.46 g of vinyltrimethoxysilane and 29 microliters of the platinum catalyst solution.

Adhesion Additive D1(d) was prepared using 31.49 g of organosiloxane 1, 18.51 g. vinyltrimethoxysilane and 29 microliters of the platinum catalyst solution.

The molar quantity of vinyltrimethoxysilane reacted with organosiloxanes 1 and 2 during the preparation of Adhesion Additives D1(c) and D1(d) was equivalent to 40% of the silicon-bonded hydrogen atoms present in the organosiloxane.

Adhesion Additive D1(e) was prepared using 45.25 g of organosiloxane 3, 4.75 g of trimethoxysilane, and 29 microliters of the platinum catalyst solution. The molar quantity of trimethoxysilane was equivalent to 40% of the vinyl radicals present on organosiloxane 3. In this instance the reactor was charged with the ethylenically unsaturated reactant and the trimethoxysilane was gradually added to the reactor.

Adhesion Additive (A.A.) D2(a) was allyltrimethoxysilane;

Adhesion Additive (A.A.) D2(b) was tetraethyl orthosilicate;

Adhesion Additive (A.A.) D2(c) was 3-glycidyoxypropyltrimethoxysilane;

Adhesion Additive D2(d) was methacryloxypropyltrimethoxysilane;

Adhesion additive D2(e) was hexenyltrimethoxysilane; and

Tetrabutyl titanate (TBT) was used as a hydrolysis and condensation catalyst.

EXAMPLE 1

Curable compositions containing the present adhesion additive mixtures were prepared by blending the following ingredients to homogeneity using the amounts shown in Table 1.

As the vinyl-containing polyorganosiloxane, a dimethylvinylsiloxy terminated polydimethylsiloxane having a viscosity of 2 Pa.s at 25 degrees C.

As the curing agent, a trimethylsiloxy-terminated polydiorganosiloxane containing an average of five methylhydrogensiloxane units and three dimethylsiloxane units per molecule with a silicon-bonded hydrogen atom content of 0.77 weight percent.

As the curing catalyst, a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.6 weight percent.

TABLE 1

| Composition | 1C | 2C | 3 | 4 |
|---|---|---|---|---|
| Vinyl Containing Polyorganosiloxane | 145 | 144 | 137 | 138 |
| Curing Catalyst | 0.253 | 0.253 | 0.253 | 0.253 |
| Pts (MeViSiO)$_x$ | 0.038 | 0.038 | 0.038 | 0.038 |
| Pts TBT | 0.15 | 0.15 | 0.15 | 0.15 |
| Pts Curing Agent | 2.4 | 1.6 | 6.6 | 5.4 |
| Pts A. A. D1(a) | 2.2 | 4.4 | 2.2 | 4.4 |
| Pts A. A. D2(a) | 0.0 | 0.0 | 3.8 | 3.8 |

In Table 1 and all of the following tables compositions identified by the letter C following the number of the composition were prepared for comparative purposes.

A portion of each composition was deaired and coated as an 8 mil (0.2 mm)-thick liquid film onto each of the following substrates using a drawdown bar: glass microscope slides (Glass), type 3003 H14 alloy mill finish aluminum Q-panels (Aluminum-Mill), and 2024 T3 Bare aluminum (Aluminum-Bare).

One set of samples was cured at room temperature and one set was cured for 30 minutes at 70° C. in a forced air oven followed by additional curing at room temperature.

The adhesion test consisted of scratching the cured coating with the blade of a metal spatula to determine whether the coating could be removed without leaving a residue on the surface (adhesive failure, AF) or whether failure occurred within the coating layer, resulting in at least a portion of the coating material in the test area adhering to the substrate (cohesive failure, CF). On some samples the coating exhibited adhesive failure in one area and cohesive failure in another area (AF/CF).

Coatings exhibiting cohesive failure were further tested to determine if the residue on the substrate and the adjacent coating material could be removed by rubbing with a finger. If the coating could be removed in this manner, the pressure required to remove the coating was rated on a subjective scale as slight (WE), medium (WM) or high (WD).

The results of the adhesion tests are summarized in Table 2 for samples cured under ambient conditions and Table 3 for samples cured in an oven for 30 minutes at a temperature of 70° C.

TABLE 2

| | Room Temperature Adhesion | | | | | | | | |
|---|---|---|---|---|---|---|---|---|---|
| | Aluminum (Bare) | | | Aluminum (Mill) | | | Glass | | |
| | Days | | | | | | | | |
| | 1 | 3 | 7 | 1 | 3 | 7 | 1 | 3 | 7 |
| 1C | AF | AF | AF | WE | CF | CF | CF | CF | CF |
| 2C | AF | AF | WE | WD | CF | CF | CF | CF | CF |
| 3 | AF | AF | AF | CF | CF | CF | CF | CF | CF |
| 4 | WE | AF/CF | WE | CF | CF | CF | CF | CF | CF |

AF/CF = One part of test sample exhibited adhesive failure and a second part cohesive failure

TABLE 3

| | Oven Cured Adhesion | | | | | | | | |
|---|---|---|---|---|---|---|---|---|---|
| | Aluminum (Bare) | | | Aluminum (Mill) | | | Glass | | |
| | Days | | | | | | | | |
| | 0 | 1 | 3 | 0 | 1 | 3 | 0 | 1 | 3 |
| 1C | AF | AF | AF | CF | CF | CF | CF | CF | CF |
| 2C | AF | AF | AF | CF | CF | CF | CF | CF | CF |
| 3 | WE | WE | WE | CF | CF | CF | CF | CF | CF |
| 4 | AF | AF/CF | WE | CF | CF | CF | CF | CF | CF |

0 = Adhesion following removal from oven and cooling to ambient temperature.
AF/CF = One section of test sample exhibited adhesive failure and a second section cohesive failure.

The data in Tables 2 and 3 demonstrate improved adhesion to aluminum using the compositions of the present invention.

EXAMPLE 2

Compositions were prepared using a two-part curable organosiloxane composition and the additional ingredients listed in Table 4.

Part I of the curable composition contained the following ingredients:

As ingredient A, 52 parts of a dimethylvinylsiloxy-terminated polydimethylsiloxane exhibiting a viscosity of 0.5 Pa.s;

As ingredient C, 0.2 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.6 weight percent;

46 parts of quartz exhibiting an average particle size of 5 microns;

0.9 part of zinc oxide;

0.5 part of carbon black; and 0.5 part of cyclic dimethylsiloxanes.

Part II of the curable composition contained the following ingredients:

As ingredient A, 46 parts of a dimethylvinylsiloxy-terminated polydimethylsiloxane exhibiting a viscosity of 0.5 Pa.s;

As ingredient B, 6 parts of a trimethylsiloxy-terminated polydiorganosiloxane having an average of five methylhydrogensiloxane units and three dimethylsiloxane units per molecule with a silicon-bonded hydrogen atom content of about 0.8 weight percent;

47 parts of quartz exhibiting an average particle size of 5 microns;

0.5 part of cyclic dimethylsiloxanes; and 0.1 part of cyclic methylvinylsiloxanes.

The curable composition was combined with the types and amounts (pts=parts) of adhesion promoters listed in Tables 4 and 5. Compositions 5, 6, 7 and 11 were prepared for comparative purposes, and are identified by the letter "C" following the number.

The results of the adhesion tests for compositions cured under ambient conditions are summarized in Table 6 and the results for the oven cured samples are summarized in Table 7.

TABLE 4

| Composition | 5C | 6C | 7C | 8 | 9 | 10 |
|---|---|---|---|---|---|---|
| Part I (pts) | 75.00 | 75.00 | 95.30 | 95.30 | 95.30 | 95.30 |
| Part II (pts) | 75.00 | 74.85 | 54.55 | 54.75 | 54.75 | 54.75 |
| Ingredient B (pts) | 0.00 | 0.00 | 0.00 | 8.00 | 0.00 | 4.00 |
| TBT (pts) | 0.00 | 0.15 | 0.15 | 0.15 | 0.15 | 0.15 |
| A.A. D1(b) (pts) | 0.00 | 0.00 | 4.00 | 4.00 | 4.00 | 4.00 |
| A.A. D2 Type | None | None | None | D2(a) | D2(b) | D2(a)/D2(b) |
| A.A. D2 (pts) | 0 | 0 | 0 | 3.8 | 3.8 | 1.9/1.9 |

TABLE 5

| Composition | 11C | 12 | 13 | 14 | 15 | 16 |
|---|---|---|---|---|---|---|
| pts Part A | 95.30 | 95.30 | 95.30 | 95.30 | 95.30 | 95.30 |
| pts Part B | 54.55 | 54.75 | 54.55 | 54.75 | 54.75 | 54.70 |
| Ing. B (pts) | 0.00 | 8.00 | 0.00 | 4.00 | 0.00 | 4.00 |
| pts TBT | 0.15 | 0.15 | 0.15 | 0.15 | 0.15 | 0.00 |
| pts A. A. D1(a) | 4.40 | 4.40 | 4.40 | 4.40 | 4.40 | 4.40 |
| A. A. D2 | None | D2(a) | D2(b) | D2(a)/D2b | D2(c) | D2(a)/D2(b) |
| A.A. D2 (pts) | 0 | 3.80 | 3.80 | 1.9/1.9 | 3.80 | 1.9/1.9 |

TABLE 6

Room Temperature Adhesion

| | Aluminum - Bare | | | Aluminum - Milled | | | Glass | | |
|---|---|---|---|---|---|---|---|---|---|
| | \multicolumn{9}{c}{Days} |
| | 1 | 3 | 7 | 1 | 3 | 7 | 1 | 3 | 7 |
| 5C | AF | AF | AF | AF | AF | AF | WD | WD | CF |
| 6C | AF | AF | AF | WE | AF | AF | AF/CF | AF | AF |
| 7C | AF | AF | AF | AF/CF | AF/CF | WD | CF | CF | CF |
| 8 | AF | AF | WE | WD | CF | CF | WD | WD | WD |
| 9 | AF | WD | CF | AF/CF | CF | CF | AF | AF | WD |
| 10 | AF | AF/CF | WD | CF | CF | CF | WD | CF | WD |
| 11C | AF | AF | AF/CF | WD | CF | CF | CF | WD | CF |
| 12 | WD | WD | WD | WD | WD | WD | WD | WD | WD |
| 13 | AF | CF | CF | WD | CF | CF | WD | CF | CF |
| 14 | WD | CF | CF | CF | CF | CF | WD | CF | CF |
| 15 | AF/CF | AF/CF | WD | AF | WD | CF | AF/CF | AF/CF | AF/CF |
| 16 | AF | AF | AF | AF | AF | AF | WD | WD | WD |

TABLE 7

Oven Cured Adhesion

| | Aluminum - Bare | | | Aluminum - Mill | | | Glass | | |
|---|---|---|---|---|---|---|---|---|---|
| | \multicolumn{9}{c}{Days} |
| | 0 | 1 | 3 | 0 | 1 | 3 | 0 | 1 | 3 |
| 5C | AF | AF | AF | AF | AF | AF | WE | CF | CF |
| 6C | AF | AF | AF | AF | AF | AF | AF | AF | AF |
| 7C | AF | AF | AF | AF | WE | CF | AF | WD | CF |
| 8 | AF | AF/CF | CF | WD | WD | CF | WD | WD | CF |
| 9 | AF | AF | CF | AF | AF | CF | AF | AF | CF |
| 10 | AF | AF | WE | AF | WD | CF | WD | WD | CF |
| 11C | AF | AF | AF | AF | WD | CF | WD | CF | CF |
| 12 | AF | WD | CF | WD | WD | CF | WD | WD | CF |
| 13 | AF | AF | CF | AF | WD | CF | WD | WD | CF |
| 14 | AF | AF | CF | WE | WD | CF | WD | WD | CF |
| 15 | AF | AF | AF/CF | AF | WD | CF | WE | WD | CF |
| 16 | AF | AF | AF | AF | AF | AF | WE | CF | CF |

EXAMPLE 3

This example demonstrates the adhesion obtained using the reaction product of a linear organohydrogensiloxane with vinyltrimethoxysilane as ingredient D1 in combination with at least one silane (ingredient D2) containing ethylenically unsaturated groups or epoxide groups.

Curable organosiloxane compositions were prepared using the two-part composition described in Example 2. Following deairing, portions of the compositions were applied as 0.008 inch (0.2 mm.)-thick coatings using a draw-down bar on glass microscope slides, sheets of copper-plated printed circuit boards, 3003 H14 alloy mill finish aluminum Q-panels (Aluminum-Mill), or 2024 T3 Bare aluminum (Aluminum-Bare). The coatings were cured either at room temperature or for 30 minutes at 70° C. in a forced air oven followed by additional curing at room temperature.

Adhesion was evaluated as described in Example 1 to determine whether the coating exhibited adhesive failure (AF), cohesive failure (CF), or had cohesive failure upon scratching with the spatula but could be wiped off using low pressure (WE), with medium pressure (WM), or with high pressure (WD) exerted by the finger. The ingredients of the various compositions are summarized in Table 8 and the adhesion test results are summarized in Tables 9 and 10.

TABLE 8

| | Sample | | | | | | | | | | |
|---|---|---|---|---|---|---|---|---|---|---|---|
| | 17C | 18C | 19 | 20 | 21 | 22 | 23C | 24C | 25C | 26C | 27C |
| pts Part I | 95.30 | 95.30 | 95.30 | 95.30 | 95.30 | 95.30 | 95.30 | 95.30 | 95.30 | 95.30 | 95.30 |
| pts Part II | 54.73 | 54.73 | 54.73 | 54.73 | 54.73 | 54.73 | 54.73 | 54.73 | 54.73 | 54.73 | 54.73 |
| pts Ing. B | 0.00 | 0.00 | 2.10 | 2.60 | 1.30 | 1.00 | 2.10 | 2.60 | 1.30 | 1.10 | 2.10 |
| pts TBT | 0.15 | 0.15 | 0.15 | 0.15 | 0.15 | 0.15 | 0.15 | 0.15 | 0.15 | 0.15 | 0.15 |
| pts AA D1(c) | 3.90 | 7.80 | 3.90 | 3.90 | 3.90 | 3.90 | — | — | — | — | — |
| AA D2 Type | — | — | (d) | (e) | (e)/(b) | (d)/(c) | (d) | (e) | (e)/(b) | (d)/(c) | (e)/(b) |
| pts AA D2 | 0.00 | 0.00 | 3.90 | 3.80 | 2.0/2.0 | 2.0/2.0 | 3.90 | 3.90 | 2.0/2.0 | 2.0/2.0 | 4.0/4.0 |

TABLE 9

| | Room Temperature Adhesion | | | | | | | | | | | |
|---|---|---|---|---|---|---|---|---|---|---|---|---|
| | Aluminum - Bare | | | Aluminum - Mill | | | Glass | | | Copper | | |
| | Days | | | | | | | | | | | |
| Sample | 1 | 3 | 7 | 1 | 3 | 7 | 1 | 3 | 7 | 1 | 3 | 7 |
| 17C | CF/WE | AF | CF | CF | CF | CF | CF | CF | CF | AF | AF | AF |
| 18C | CF | CF | WE | CF | CF | CF | CF | CF | CF | AF | AF | AF |
| 19 | AF | CF | CF | AF | AF | AF/CF | CF | CF | CF | AF | CF | CF |
| 20 | CF | CF | CF | CF | CF | CF | CF | CF | CF | AF | AF | AF |
| 21 | WE | WE | AF/CF | CF | CF | CF | CF | CF | CF | AF | AF | AF |
| 22 | AF | CF | CF | AF | AF | CF | CF | CF | CF | AF/CF | CF | CF |
| 23C | AF | AF | AF | AF | AF | AF | AF | AF/CF | AF/CF | AF | AF | AF |
| 24C | AF | AF | AF | AF/CF | AF | AF | CF | CF | CF | AF | AF | AF |
| 25C | AF | AF | AF | AF | AF | AF | CF | CF | CF | AF | AF | AF |
| 26C | AF | AF | AF | AF | AF | AF/CF | CF | CF | CF | AF | CF | CF |
| 27C | AF/CF | CF/WEAF | | AF | AF | AF/CF | CF | CF | CF | AF | AF | AF |

TABLE 10

| | Oven Cured Adhesion | | | | | | | | | | | |
|---|---|---|---|---|---|---|---|---|---|---|---|---|
| | Aluminum - Bare | | | Aluminum - Mill | | | Glass | | | Copper | | |
| | Days | | | | | | | | | | | |
| Sample | 0 | 1 | 3 | 0 | 1 | 3 | 0 | 1 | 3 | 0 | 1 | 3 |
| 17C | AF | AF | AF | CF | CF | CF | CF | CF | CF | AF | AF | AF |
| 18C | AF | AF | CF | AF/CF | CF | CF | CF | CF | CF | AF | CF/WE | CF/WE |
| 19 | AF | AF | AF | AF | AF | AF/CF | CF | CF | CF | AF | AF | AF |
| 20 | AF | AF | WE | CF | CF | CF | CF | CF | CF | AF | AF | AF |
| 21 | AF | AF | AF | CF | CF | CF | CF | CF | CF | AF | AF | AF |

TABLE 10-continued

| | Oven Cured Adhesion | | | | | | | | | | | |
|---|---|---|---|---|---|---|---|---|---|---|---|---|
| | Aluminum - Bare | | | Aluminum - Mill | | | Glass | | | Copper | | |
| | Days | | | | | | | | | | | |
| Sample | 0 | 1 | 3 | 0 | 1 | 3 | 0 | 1 | 3 | 0 | 1 | 3 |
| 22 | AF | AF | WE | WE | CF | CF | CF | CF | CF | AF | AF | AF |
| 23C | AF | AF | AF | AF | AF | AF | AF | AF | AF | AF | AF | AF |
| 24C | AF | AF | AF | AF | AF | AF/CF | CF | CF | CF | AF | AF | AF |
| 25C | AF | AF | AF | AF | AF | AF | CF | CF | CF | AF | AF | AF |
| 26C | AF | AF | AF | AF | AF | AF | AF | AF | CF/WM | AF | AF | AF |
| 27C | AF | AF | AF | AF | AF | AF | CF | CF | CF | AF | AF | AF |

EXAMPLE 4

This example demonstrates the adhesion provided by the combination of a reaction product of a diorganohydrogensiloxy/$SiO_{4/2}$ copolymer and vinyltrimethoxysilane as ingredient D1(d) and one or two of tetraethyl orthosilicate [D2(b)], 3-glycidoxypropyltrimethoxysilane [D2(c)], 3-methacryloxypropyltrimethoxysilane [D2(d)] and hexenyltrimethoxysilane [D2(e)]. The ingredients of the compositions are summarized in Table 11 and the results of the adhesion tests in Tables 12 and 13.

TABLE 11

| Composition | 28C | 29C | 30C | 31 | 32 | 33 | 34 | 35 | 36 | 37 | 38 | 39 |
|---|---|---|---|---|---|---|---|---|---|---|---|---|
| pts Part A | 95.30 | 95.30 | 95.30 | 95.30 | 95.30 | 95.30 | 95.30 | 95.30 | 95.30 | 95.30 | 95.30 | 95.30 |
| pts Part B | 54.73 | 54.73 | 54.73 | 54.73 | 54.73 | 54.73 | 54.73 | 54.73 | 54.73 | 54.73 | 54.73 | 54.73 |
| pts Ing. B | 1.10 | — | — | 2.10 | 2.60 | 1.30 | 1.00 | 1.00 | 1.30 | 0.60 | 0.50 | 0.50 |
| pts TBT | 0.15 | 0.15 | 0.15 | 0.15 | 0.15 | 0.15 | 0.15 | 0.15 | 0.15 | 0.15 | 0.15 | 0.15 |
| pts D1(d) | 2.20 | 4.30 | 8.60 | 4.30 | 4.30 | 4.30 | 4.30 | 2.20 | 2.20 | 2.20 | 2.20 | 2.20 |
| AA D2 | — | — | — | (d) | (e) | (e)/(b) | (d)/(c) | (d) | (e) | (e)/(b) | (d)/(c) | (d)/(b) |
| pts AA D2 | — | — | — | 3.90 | 3.90 | 2.0/2.0 | 2.0/2.0 | 2.00 | 2.00 | 1.0/1.0 | 1.0/1.0 | 1.0/1.0 |

TABLE 12

| | Room Temperature Adhesion | | | | | | | | | | | |
|---|---|---|---|---|---|---|---|---|---|---|---|---|
| | Aluminum - Bare | | | Aluminum - Mill | | | Glass | | | Copper | | |
| | Days | | | | | | | | | | | |
| Sample | 1 | 3 | 7 | 1 | 3 | 7 | 1 | 3 | 7 | 1 | 3 | 7 |
| 28C | WE | AF | AF | CF | WE | CF | CF | CF | CF | AF | AF | AF |
| 29C | CF | WE | AF | CF | CF | CF | CF | CF | CF | AF | AF | AF |
| 30C | CF | CF | CF | CF | CF | CF | CF | CF | CF | AF/CF | AF | AF |
| 31 | — | CF | CF | — | CF | CF | — | CF | CF | AF | CF | CF |
| 32 | CF | CF | CF | CF | CF | CF | CF | CF | CF | AF | AF | AF |
| 33 | CF | CF | CF | CF | CF | CF | CF | CF | CF | AF | AF | AF |
| 34 | — | CF | CF | — | CF | CF | — | CF | CF | AF | CF | CF |
| 35 | CF | AF | AF | CF | CF | CF | CF | CF | CF | CF | CF | CF |
| 36 | WE | AF | AF | CF | CF | CF | CF | CF | CF | AF/CF | AF | AF |
| 37 | CF | AF/CF | AF/CF | CF | CF | CF | CF | CF | CF | AF | AF | AF |
| 38 | CF | CF | CF | CF | CF | CF | CF | CF | CF | CF | CF | CF |
| 39 | CF | CF | CF | CF | CF | CF | CF | CF | CF | CF | WE | AF/CF |

TABLE 13

| | Oven Cured Adhesion | | | | | | | | | | | |
|---|---|---|---|---|---|---|---|---|---|---|---|---|
| | Aluminum - Bare | | | Aluminum - Mill | | | Glass | | | Copper | | |
| | Day | | | | | | | | | | | |
| Sample | 0 | 1 | 3 | 0 | 1 | 3 | 0 | 1 | 3 | 0 | 1 | 3 |
| 28C | AF | AF | AF | AF | AF/CF | CF | AF | AF/CF | AF | AF | AF | AF |
| 29C | AF | AF | AF | AF/CF | CF | CF | CF | CF | CF | AF | AF | AF |
| 30C | AF | CF/WE | CF/WE | CF/WE | CF | CF | CF | CF | CF | AF | AF | AF |
| 31 | AF | AF | AF | AF/CF | CF/WE | CF | CF | CF | CF | AF | AF | AF |
| 32 | WE | AF/CF | AF/CF | CF | CF | CF | CF | CF | CF | AF | AF | AF |
| 33 | AF/CF | AF/CF | WE | CF | CF | CF | CF | CF | CF | AF | AF | AF |
| 34 | AF | WE | CF | WE | CF | CF | CF | CF | CF | AF | AF | AF |
| 35 | AF | AF | AF | AF | AF | AF | CF | CF | CF | AF | AF | AF |
| 36 | AF | AF | AF | CF/WM | CF | CF | CF | CF | CF | AF | AF | AF |
| 37 | AF | AF | AF | CF/WE | CF | CF | CF | CF | CF | AF | AF | AF |
| 38 | AF | AF | AF | CF/WE | AF/CF | CF | CF | CF | CF | AF | AF | AF |
| 39 | AF | AF | AF | AF | AF | AF | CF | CF | CF | AF | AF | AF |

EXAMPLE 5

This example demonstrates the adhesion provided by the combination of a reaction product of a diorganovinylsiloxy/ $SiO_{4/2}$ copolymer and trimethoxysilane as ingredient D1(e) and one or two of tetraethyl orthosilicate [D2(b)], 3-methacryloxypropyltrimethoxysilane [D2(d)] and hexenyltrimethoxysilane [D2(e)]. The ingredients of the compositions are summarized in Table 14 and the results of the adhesion tests in Tables 15 and 16.

TABLE 14

| Composition | 40C | 41C | 42C | 43 | 44 | 45 | 46 | 47 | 48 | 49 | 50 | 51 |
|---|---|---|---|---|---|---|---|---|---|---|---|---|
| pts Part A | 95.30 | 95.30 | 95.30 | 95.30 | 95.30 | 95.30 | 95.30 | 95.30 | 95.30 | 95.30 | 95.30 | 95.30 |
| pts Part B | 54.73 | 54.73 | 54.73 | 54.73 | 54.73 | 54.73 | 54.73 | 54.73 | 54.73 | 54.73 | 54.73 | 54.73 |
| pts Ing. B | 0.30 | 0.70 | 1.40 | 2.80 | 3.30 | 2.00 | 1.70 | 1.30 | 1.60 | 0.90 | 0.80 | 0.80 |
| pts TBT | 0.15 | 0.15 | 0.15 | 0.15 | 0.15 | 0.15 | 0.15 | 0.15 | 0.15 | 0.15 | 0.15 | 0.15 |
| pts D1(e) | 2.00 | 4.00 | 8.00 | 4.00 | 4.00 | 4.00 | 4.00 | 2.00 | 2.00 | 2.00 | 2.00 | 2.00 |
| AA D2 | — | — | — | (d) | (e) | (e)/(b) | (d)/(c) | (d) | (e) | (e)/(b) | (d)/(c) | (d)/(b) |
| pts AA D2 | — | — | — | 3.90 | 3.90 | 2.0/2.0 | 2.0/2.0 | 2.00 | 2.00 | 1.0/1.0 | 1.0/1.0 | 1.0/1.0 |

TABLE 15

| | Room Temperature Adhesion | | | | | | | | | | | |
|---|---|---|---|---|---|---|---|---|---|---|---|---|
| | Aluminum - Bare | | | Aluminum - Mill | | | Glass | | | Copper | | |
| | Days | | | | | | | | | | | |
| Sample | 1 | 3 | 7 | 1 | 3 | 7 | 1 | 3 | 7 | 1 | 3 | 7 |
| 40C | AF | AF | AF | AF | AF | AF | AF | AF | AF | AF | AF | AF |
| 41C | AF | AF | AF | AF | AF | AF | AF | AF | AF | AF | AF | AF |
| 42C | AF | AF | AF | AF | AF | AF | AF/CF | AF | AF | AF | AF | AF |
| 43 | AF | AF | AF | AF | AF | AF | AF | AF | WE | AF | CF | CF |

TABLE 15-continued

| | Room Temperature Adhesion | | | | | | | | | | | |
|---|---|---|---|---|---|---|---|---|---|---|---|---|
| | Aluminum - Bare | | | Aluminum - Mill | | | Glass | | | Copper | | |
| | Days | | | | | | | | | | | |
| Sample | 1 | 3 | 7 | 1 | 3 | 7 | 1 | 3 | 7 | 1 | 3 | 7 |
| 44 | AF | AF | AF/CF | CF/WM | CF | CF | CF | CF | CF | AF | AF | AF |
| 45 | AF/CF | AF | AF | WE | WE | AF/CF | CF | CF | CF | AF | AF | AF |
| 46 | AF | CF | CF | AF | AF | AF/CF | CF | CF | CF | AF | CF | CF |
| 47 | AF | AF | AF | AF | AF | AF | AF | AF | AF/CF | AF | CF | CF |
| 48 | AF | AF | AF | WE | AF | AF | CF | CF | CF | AF | AF | AF |
| 49 | AF | AF | AF | WE | AF | AF | CF | CF | CF | AF | AF | AF |
| 50 | AF | CF | CF | AF | AF | AF/CF | CF | CF | CF | AF | CF | CF |
| 51 | AF | AF | AF | AF | AF | AF | CF/WM | CF/WE | CF/WE | AF | CF | CF |

TABLE 16

| | Oven Cured Adhesion | | | | | | | | | | | |
|---|---|---|---|---|---|---|---|---|---|---|---|---|
| | Aluminum - Bare | | | Aluminum - Mill | | | Glass | | | Copper | | |
| | Day | | | | | | | | | | | |
| Sample | 0 | 1 | 7 | 0 | 1 | 7 | 0 | 1 | 7 | 0 | 1 | 7 |
| 40C | AF | AF | AF | AF | AF | AF | AF | AF | AF | AF | AF | AF |
| 41C | AF | AF | AF | AF | AF | AF | AF | AF | AF | AF | AF | AF |
| 42C | AF | AF | AF | AF | AF | AF | AF | AF | AF | AF | AF | AF |
| 43 | AF | AF | AF | AF | AF | AF | AF | AF | AF | AF | AF | AF |
| 44 | AF | AF | AF | AF | AF | AF | CF | CF | CF | AF | AF | AF |
| 45 | AF | AF | AF | AF/CF | WE | CF | CF | CF | CF | AF | AF | AF |
| 46 | AF | AF | CF | AF | AF/CF | CF | AF | CF | CF | AF | AF | CF |
| 47 | AF | AF | AF | AF | AF | AF | AF | AF | AF | AF | AF | AF |
| 48 | AF | AF | AF | WM | CF | CF | CF | CF | CF | AF | AF | AF |
| 49 | AF | AF | AF | AF | AF | CF/WM | CF | CF | CF | AF | AF | AF |
| 50 | AF | AF | AF | AF | AF | CF | AF | CF | CF | AF | AF | WM |
| 51 | AF | AF | AF | AF | AF | AF | AF | AF | WM | AF | AF | AF |

EXAMPLE 6

This example demonstrates the utility of the present adhesion promoting additives in a photocurable organosiloxane composition.

Curable compositions were prepared by combining the following ingredients to homogeneity:

- as the curable polyorganosiloxane (ingredient A), an acrylamideisobutyldimethylsiloxy, $CH_2=CHC(O)N(CH_3)CH_2C(CH_3)HCH_2Si(CH_3)_2O-$, terminated dimethylsiloxane/phenylmethylsiloxane copolymer containing 7.5 mole percent of phenylmethylsiloxy units and a viscosity of 0.8 Pa.s;
- as the hydrolysis catalyst, a mixture of titanium ortho ester complexes available as Tyzor(R) GBA from the E.I Dupont de Nemours and Co.;
- as the photoinitiator, 2-hydroxy-2-methyl-1-phenylpropan-1one;
- as adhesion promoter D1 (AA D1), an organosiloxane copolymer exhibiting the average formula $Me_3SiO(Me_2SiO)_3(HMeSiO)_3(RMeSiO)(R'MeSiO)SiMe_3$ where Me is methyl, R represents $-CH_2CH_2Si(OMe)_3$ and R' represents

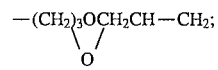

and

- as adhesion promoting additive D2, vinyltrimethoxysilane.

The concentrations of these ingredients in the four compositions evaluated are summarized in Table 17. Each composition contained 0.25 weight percent of the hydrolysis catalyst.

TABLE 17

| | Composition | | | | | | |
|---|---|---|---|---|---|---|---|
| Ingredient (%) | 52 | 53 | 54 | 55 | 56C | 57C | 58C |
| A | 93.75 | 94.75 | 92.75 | 91.75 | 93.75 | 91.25 | 93.75 |
| Photoinitiator | 1.00 | 1.00 | 1.00 | 1.33 | 1.00 | 1.0 | 1.0 |
| AA D1 | 2.50 | 1.50 | 3.50 | 2.50 | 0.0 | 0.0 | 5.00 |
| AA D2 | 2.5 | 2.5 | 2.5 | 2.5 | 5.0 | 7.5 | 0.00 |

The compositions were aged for one or two days prior to being applied as coatings to the glass, aluminum and copper substrates described in the preceding examples. Liquid films of about 0.01 inch (0.25 mm) in thickness were cast on to the desired substrate and cured by exposure to ultraviolet radiation. Each coated sample was passed twice through a model UV-6 single lamp conveyor type coating unit manufactured by Cololight, Minneapolis, Minn. At a power setting of 300 watts, the radiation dose emitted during one pass through the unit was measured as 3.0 Joule/cm$^2$ using a model IL 390 light bug. Adhesion of the cured coatings to the substrates was measured immediately after curing and after the cured coatings aged for 30, 60 and 120 minutes under ambient conditions. The samples used for comparative purposes were not aged prior to curing.

The results of the adhesion evaluation are recorded in Table 18.

TABLE 18

| Sample | Pre-Cure Aging (Days) | Substrate | Post-cure Aging (Minutes) | | | |
|---|---|---|---|---|---|---|
| | | | 0 | 30 | 60 | 120 |
| 52 | 1 | Al | AF | AF* | AF | AF |
| | | Glass | CF | CF | CF | CF |
| | | Cu | AF | AF | AF | AF |
| | 2 | Al | CF | CF | CF | CF |
| | | Glass | CF | CF | CF | CF |
| | | Cu | AF | AF | AF | AF |
| 53 | 1 | Al | AF* | AF* | AF | AF |
| | | Glass | AF* | AF* | CF | CF |
| | | Cu | AF | AF | AF | AF |
| | 2 | Al | CF | CF | CF | CF |
| | | Glass | CF | CF | CF | CF |
| | | Cu | AF | AF | AF | AF |
| 54 | 1 | Al | AF* | AF* | AF* | AF* |
| | | Glass | CF | CF | CF | CF |
| | | Cu | AF | AF | AF | AF |
| | 2 | Al | AF* | AF* | AF/CF | AF/CF |
| | | Glass | CF | CF | CF | CF |
| | | Cu | AF | AF | AF | AF |
| 55 | 1 | Al | CF | CF | CF | CF |
| | | Glass | CF | CF | CF | CF |
| | | Cu | CF | AF/CF | AF* | AF* |
| | 2 | Al | CF | CF | CF | CF |
| | | Glass | CF | CF | CF | CF |
| | | Cu | CF | AF* | CF | CF |
| 56C | 1 | Al | AF | AF | AF | AF |
| | | Glass | CF | CF | CF | CF |
| | | Cu | AF | AF | AF | AF |
| 57C | 1 | Al | AF | AF | AF | AF |
| | | Glass | CF | CF | CF | CF |
| | | Cu | AF | AF | AF | AF |
| 58C | 1 | Al | CF | CF | CF | CF |
| | | Glass | CF | CF | CF | CF |
| | | Cu | AF | AF* | AF | AF* |

AF* = Adhesive failure with noticeable adhesion

That which is claimed is:

1. An adhesion promoting additive for curable organosiloxane compositions, said additive comprising
   (I) an organosiloxane comprising at least one unit of the general formula $R^1R^2_aSiO_{(3-a)/2}$ and at least one unit containing three silicon-bonded hydrolyzable groups selected from the group consisting of alkoxy and enoloxy; and
   (II) a silane of the formula $R^3_bSi(OR^4)_{4-b}$ or bis-silylalkane of the formula $[(R^4O)_3Si]_2R^5$
wherein $R^1$ is selected from the group consisting of hydrogen, alkenyl radicals, and $CH_2=CR^6C(O)OR^7-$, $R^2$ represents an unsubstituted or substituted monovalent hydrocarbyl radical, $R^3$ is selected from the group consisting of monovalent ethylenically unsaturated groups bonded to silicon through carbon and epoxide-substituted hydrocarbon radicals, $OR^4$ is selected from the group consisting of alkoxy groups containing from 1 to 4 carbon atoms and enoloxy groups containing from 3 to 6 carbon atoms, $R^5$ is an alkylene radical, $R^6$ is hydrogen or methyl, $R^7$ is an alkylene radical, a is 0, 1 or 2, and b is 0 or 1.

2. An additive according to claim 1 wherein $R^1$ represents an alkenyl radical containing from 2 to 20 carbon atoms or hydrogen; $R^2$ represents an alkyl radical containing from 1 to 10 carbon atoms, phenyl or 3,3,3-trifluoropropyl; units containing $R^1$ constitute from 10 to 50 percent of the units present in said organosiloxane; units containing said hydrolyzable groups constitute from 10 to 30 percent of the units present in said organosiloxane; the terminal units of said organosiloxane are selected from the group consisting of $R^1R^2_2SiO_{1/2}R^2_3SiO_{1/2}$ and $X_3SiO_{1/2}$, where X represents a hydrolyzable group; $R^3$ is selected from the group consisting of alkenyl radicals containing from 2 to 10 carbon atoms, 3-methacryloxypropyl and 3-glycidoxypropyl, $OR^4$ is selected from the group consisting of alkoxy containing from 1 to 4 carbon atoms and isopropenyloxy; $R^5$ is ethyl, $R^6$ is methyl, and $R^7$ is propylene.

3. An additive according to claim 1 wherein at least 50 percent of the repeating units of said organosiloxane are selected from the group consisting of $CH_3HSiO$, $(CH_3)_2HSiO_{1/2}$, $(CH_3)_2CH_2=CHSiO_{1/2}$ and $Si_{4/2}$; said silane is selected from the group consisting of vinyltrimethoxysilane, allyltrimethoxysilane, 5-hexenyltrimethoxysilane, tetraethyl orthosilicate, 3-glycidoxypropyltrimethoxysilane and 3-methacryloxypropyltrimethoxysilane.

4. In an improved curable organosiloxane composition comprising
   A. a polyorganosiloxane containing at least two groups per molecule that react to achieve curing of said composition;
   B. a curing agent in an amount sufficient to cure said composition; and
   C. an amount of a curing catalyst sufficient to promote curing of said composition;
wherein curing of said composition is achieved by the reaction of silicon-bonded hydrogen atoms on said curing agent with alkenyl radicals or silanol groups present on said polyorganosiloxane or by the photoinduced generation of free radicals,
   the improvement comprising the presence in said composition of an adhesion promoting additive comprising
      (I) an organosiloxane comprising at least one unit of the general formula $R^1R^2_aSiO_{(3-a)/2}$ and at least one unit containing three silicon-bonded hydrolyzable groups selected from the group consisting of alkoxy and enoloxy; and
      (II) an organosilicon compound selected from the group consisting of silanes of the formula $R^3_bSi(OR^4)_{4-b}$ and bis-silylalkanes of the formula $[(R^4O)_3Si]_2R^5$ wherein $R^1$ is selected from the group consisting of hydrogen, alkenyl radicals, and $CH_2=CR^6C(O)OR^7-$, $R^2$ represents an unsubstituted or substituted monovalent hydrocarbyl radical, $R^3$ represents a monovalent ethylenically unsaturated group bonded to silicon through carbon or an epoxide-substituted hydrocarbon radical, $OR^4$ represents an alkoxy group containing from 1 to 4 carbon atoms or an enoloxy group containing from 3 to 6 carbon atoms, $R^5$ is an alkylene radical, $R^6$ is hydrogen or methyl, $R^7$ is an alkylene radical, a is 0, 1 or 2, and b is 0 or 1.

5. A composition according to claim 4 wherein $R^1$ represents an alkenyl radical containing from 2 to 20 carbon atoms or hydrogen; $R^2$ represents an alkyl radical containing from 1 to 10 carbon atoms, phenyl or 3,3,3-trifluoropropyl; units containing $R^1$ constitute from 10 to 50 percent of the units present in said organosiloxane; units containing said hydrolyzable groups constitute from 10 to 30 percent of the units present in said organosiloxane; the terminal units of said organosiloxane are selected from the group consisting of $R^1R^2{}_2SiO_{1/2}$, $R^2{}_3SiO_{1/2}$ and $X_3SiO_{1/2}$, where X represents a hydrolyzable group; $R^3$ is selected from the group consisting of, alkenyl containing from 2 to 10 carbon atoms, 3-methacryloxypropyl and 3-glycidoxypropyl, $OR^4$ is selected from the group consisting of alkoxy containing from 1 to 4 carbon atoms and enoloxy containing from 3 to 6 carbon atoms; $R^5$ is ethyl, $R^6$ is methyl, and $R^7$ is propylene.

6. A composition according to claim 5 wherein at least 50 percent of the repeating units of said organosiloxane are selected from the group consisting of $CH_3HSiO$, $(CH_3)_2HSiO_{1/2}$, $(CH_3)_2CH_2{=}CHSiO_{1/2}$ and $SiO_{4/2}$; said silane is selected from the group consisting of vinyltrimethoxysilane, allyltrimethoxysilane, 5-hexenyltrimethoxysilane, tetraethyl orthosilicate, 3-glycidoxypropyltrimethoxysilane and 3-methacryloxypropyltrimethoxysilane.

7. A composition according to claim 6 wherein said composition cures by a platinum catalyzed hydrosilation reaction or by reaction with free radicals generated by the decomposition of a photolytically unstable compound.

8. A composition according to claim 7 wherein said composition cures by a hydrosilation reaction, said polyorganosiloxane is a polydiorganosiloxane A represented by the general formula

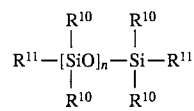

wherein each $R^{10}$ is individually selected from monovalent hydrocarbon radicals and monovalent halohydrocarbon radicals, $R^{11}$ represents a vinyl or other alkenyl radical, and n represents a degree of polymerization equivalent to a viscosity of at least 100 centipoise (0.1 Pa.s);

the viscosity of said organohydrogensiloxane at 25° C. is from 0.003 to 10 Pa.s;

the organic groups bonded to the silicon atoms of said organohydrogensiloxane are monovalent unsubstituted or substituted hydrocarbon radicals;

the concentration of said organohydrogensiloxane provides a molar ratio of silicon-bonded hydrogen atoms to alkenyl radicals in said composition of from 0.5 to 2; and the concentration of said hydrosilation catalyst is equivalent to from 1 to 50 parts by weight of platinum group metal per million parts by weight of the combination of said polyorganosiloxane and said organohydrogensiloxane.

* * * * *